J. ALLONAS.
Portable-Engine.
No. 221,266. Patented Nov. 4, 1879.
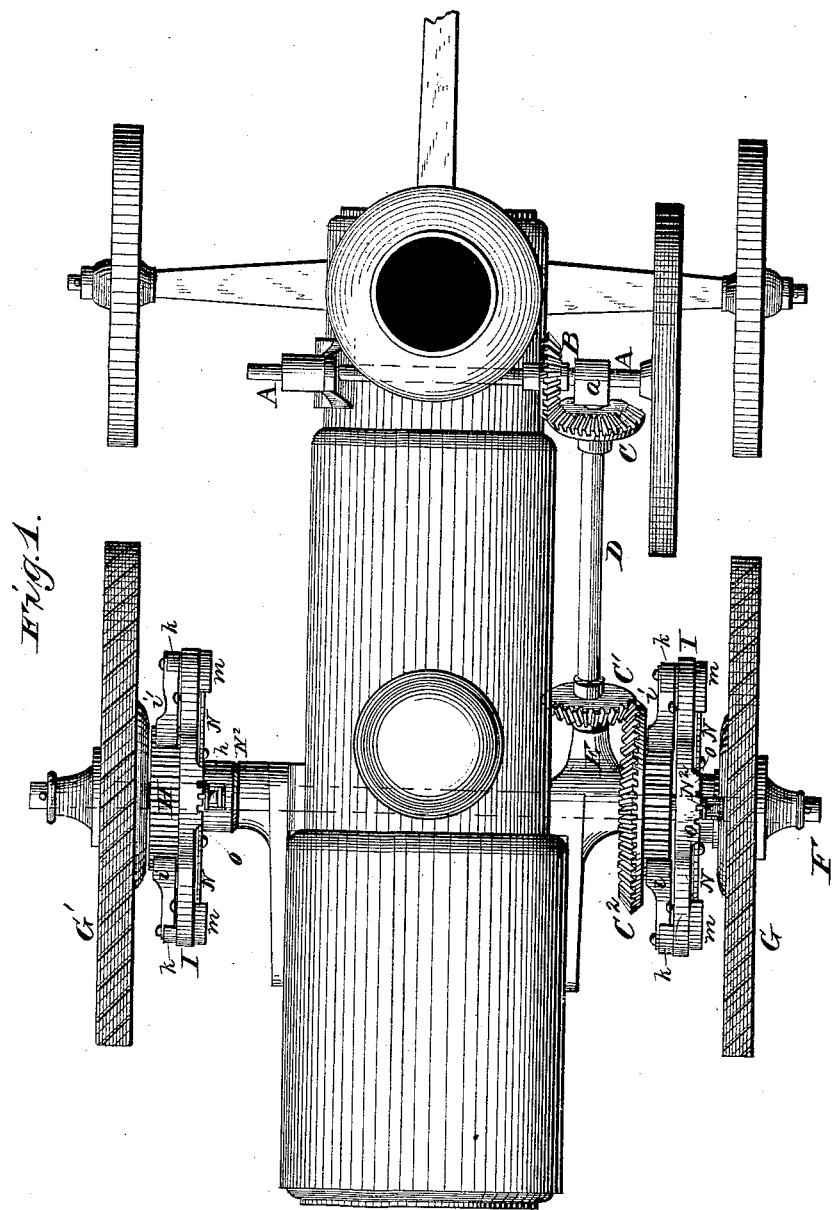
WITNESSES
Franck L. Ouraud
Alexander Mahon
By
INVENTOR
Joseph Allonas
A. M. Smith
ATTORNEY

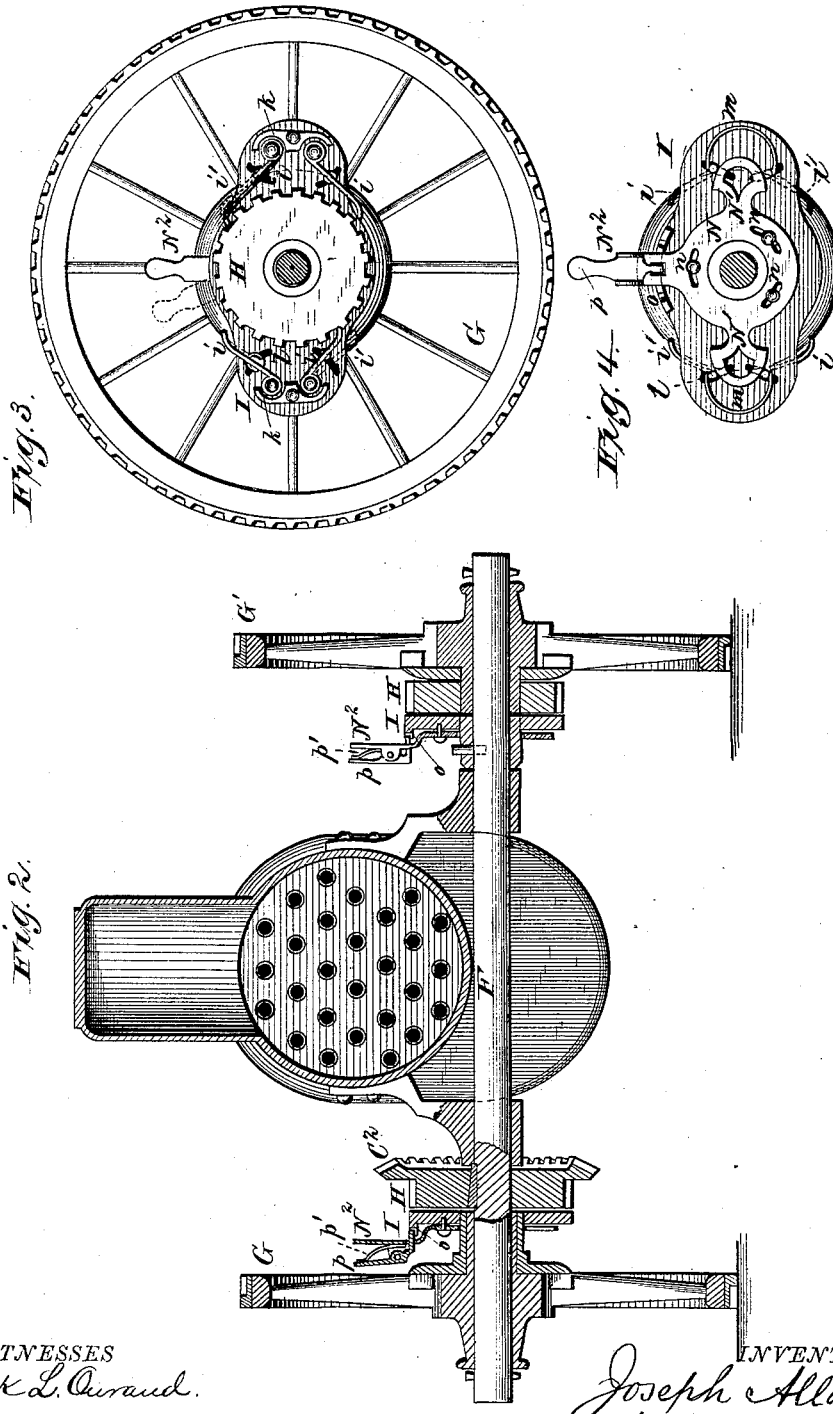

UNITED STATES PATENT OFFICE.

JOSEPH ALLONAS, OF MANSFIELD, OHIO; M. D. HARTER, EXECUTOR OF ESTATE OF SAID ALLONAS, DECEASED.

IMPROVEMENT IN PORTABLE ENGINES.

Specification forming part of Letters Patent No. 221,266, dated November 4, 1879; application filed February 5, 1879.

*To all whom it may concern:*

Be it known that I, JOSEPH ALLONAS, of Mansfield, county of Richland, State of Ohio, have invented a new and useful Improvement in Portable Engines, of which the following is a full, clear, and exact description, reference being had to the accompanying drawings, making part of this specification, in which—

Figure 1 is a plan or top view of so much of a portable engine as is necessary to show my improvements. Fig. 2 is a transverse vertical section through the same, taken in line with the bearing-brackets of the main axle. Fig. 3 is a longitudinal section, showing one of the traction-wheels, with the ratchet-wheel and pawl-carrier in side elevation; and Fig. 4 is a side elevation of the pawl-carrier and pawl-adjusting devices, taken from the opposite side to that shown in Fig. 3.

Similar letters of reference denote corresponding parts wherever used.

My invention relates to a novel arrangement of pawls for connecting the main ground or traction wheels of the engine with the rotating axle for moving or propelling the engine, and to the means for effecting the adjustment of the pawls for connecting the wheels with the axle moving in either direction, or for disconnecting the wheels from the axle, as hereinafter described.

The engine, in its general outline of construction and arrangement of parts, is similar to that described in another application, and need not therefore be specifically described here, except in the parts embodying my invention.

A in the accompanying drawings represents the main driving-shaft, to which motion is imparted by the engine, and from which it is communicated, through suitable band wheel or gearing, to the thrashing or other machinery to be driven, in any usual or preferred manner. This shaft has a bevel-wheel, B, mounted upon it, which in practice is provided with a clutch, by means of which it can be made fast or left loose upon the shaft, as desired.

The wheel B engages with and drives a bevel-wheel, C, keyed to an inclined shaft, D, having a bearing at its upper forward end in a bracket, $a$, in which the shaft A also has a bearing, and at its lower end in an arm of bracket E, in which the main axle F also has a bearing.

The lower end of shaft D is armed with a bevel-wheel, C', which engages with and drives a bevel-wheel, $C^2$, keyed or otherwise rigidly attached to and rotating the axle F. G G' are the main ground or carrying wheels mounted loosely on the axle F, and adapted to be connected with the axle for moving or propelling the engine over the road as follows, viz: Upon the axle is mounted at each end, adjacent to the ground-wheels, a ratchet-wheel, H, and a pawl-carrier, I, one rigidly connected to and rotating with the axle, and the other rigidly connected with the wheel. Both arrangements are shown, the pawl-carrier I at one end being rigidly connected with the wheel, and at the other rigidly connected with the rotating axle. It will be apparent that either arrangement may be used; but the former being shown in detail in Figs. 3 and 4, the description will be made with specific reference to that arrangement.

The pawl-carrier I is made in the elongated form shown in Figs. 3 and 4, and at each end has two pawls, $i\ i'$, pivoted to it, one for engaging with the ratchet-wheel H, when moving in one direction, and the other for engaging with it when rotating in the opposite direction. In addition to pivoting the ends of these pawls directly to the plate or carrier I, the pivoted ends themselves, made in rounded or pivotal form, fit snugly and turn in semi-cylindrical sockets in plates $k$, rigidly secured to the carrier I, and which serve to give greatly-increased strength to the pivotal connection between the pawls and pawl-carriers.

The pawls midway of their length are provided with lateral pins or spurs, which pass through slots, at $l$, in the pawl-carrier, curved each in the arc of a circle of which the pivot to the pawl is the center. These pins, on the side of the carrier opposite to the pawls, are connected by a curved spring, $m$, the tension of which is exerted to draw the pawls toward each other and into engagement with the ratchet-wheel H.

N is a perforated disk or plate mounted loosely on the axle or hub of the driving-wheel, and connected with the pawl-carrier by headed pins $n$ passing through curved slots in the plate N, as shown in Fig. 4, in such manner that, while the plate is held to and moves with the carrier, a slight adjustment of it around the axle relatively to the pawl-carrier is permitted for effecting the adjustment of the pawls. This plate is provided with cam-shaped arms or projections N' on its opposite sides, which pass between and in contact with the pins of the opposing pawls $i$ $i'$, as shown in Fig. 4, in such manner that as the plate N is vibrated relatively to the pawl-carrier, one or the other of the pawls $i$ or $i'$ of each pair, according to the direction of movement of the plate, will be moved away from the ratchet-wheel, while the other, following the movement of the arm N', will be forced inward toward or into engagement with the ratchet-wheel by the action of its spring $m$.

By this arrangement it will be seen that as the plate N is vibrated or adjusted one pawl of each pair may be moved toward or thrown into engagement with the ratchet-wheel, while the other is moved out of engagement with, or away from, said wheel, for engaging the ground-wheel with the axle moving in either direction, or for disengaging both pawls, and therewith the ground-wheel from the axle, as desired.

The plate N is provided on one side with an arm or lever, N², facilitating its adjustment, and a thumb-latch, $p$, pivoted to said arm, has a pin or spur formed upon it, which engages with a rack, at $o$, on the carrier I, and serves to hold the plate N, and with it the pawls $i$ $i'$, at the desired adjustment, a spring, $p'$, serving to hold the latch engaged with the rack when not forced out by hand.

By the construction and arrangement of parts described the adjustment of the pawls is greatly facilitated. They are arranged in pairs, and all employed for connecting any one wheel with the axle, are adjusted simultaneously by the movement of a single lever, whether for throwing into action in either direction or for disconnecting the ground-wheel from the rotary movement of its axle, thus facilitating the application of the power of the engine for propelling itself over the road, for backing it when required, and for superseding or supplementing the power of the team, so that the latter can be used merely for guiding, or for both guiding and assisting in the propulsion of the engine, as the character of the ground over which the engine is being moved may require.

Having now described my invention, what I claim as new, and desire to secure by Letters Patent, is—

1. In a traction-engine, the combination, with the power-driven axle and the truck-wheels mounted loosely thereon, of a double pawl-and-ratchet mechanism for imparting movement to the wheels in either direction, and mechanism whereby the pawls may be not only shifted, but also held entirely out of engagement with their ratchets.

2. The rear-truck wheels, in combination with mechanism for rotating the axle by the main engine-shaft, the ratchet-wheels, a double set of pawls, and mechanism, substantially as described, for shifting the pawls at will.

3. The rear-truck axle, in combination with the pawl-carriers, the double sets of pawls, and the ratchet-wheels connected with and operating the truck-wheels, substantially as described.

4. The pawl-carriers on the axle, in combination with the double sets of pawls, the springs, the ratchets, and the mechanism for shifting the pawls at will.

5. The inclined shaft driven by the engine-shaft and provided at its lower end with the bevel-pinion, in combination with the loose axle and the gear-wheel rigidly secured thereto, pawl-carriers, double pawls, ratchet-wheels, and a pawl-shifting device, substantially as described.

6. The pawls intermediate between the rotating axle and the traction-wheels, arranged in pairs connected by a single spring, substantially as described.

7. The combination, with the pawl-carriers, of the pawls arranged in pairs and the adjusting disk or plate for simultaneously adjusting said pawls, substantially as described.

In testimony whereof I have hereunto set my hand this 25th day of January, A. D. 1879.

JOSEPH ALLONAS.

Witnesses:
J. M. YZNAGA,
ALEXANDER MAHON.